(12) United States Patent
Patadia et al.

(10) Patent No.: US 10,171,593 B2
(45) Date of Patent: Jan. 1, 2019

(54) VALIDATING WEB SERVICES FOR COMPATIBILITY WITH A CLIENT DEVICE BY EMULATING THE CLIENT DEVICE BY POPULATING A TEMPLATE ASSOCIATED WITH THE WEB SERVICES

(71) Applicant: Verizon Patent and Licensing Inc., Arlington, VA (US)

(72) Inventors: Amit B. Patadia, Plano, TX (US); Lakshmi N. Chakarapani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 632 days.

(21) Appl. No.: 14/319,518

(22) Filed: Jun. 30, 2014

(65) Prior Publication Data
US 2015/0381742 A1     Dec. 31, 2015

(51) Int. Cl.
*H04L 29/08*     (2006.01)

(52) U.S. Cl.
CPC .............. *H04L 67/16* (2013.01); *H04L 67/02* (2013.01)

(58) Field of Classification Search
CPC ......... H04L 67/02; H04L 67/12; H04L 67/16; H04L 41/50; H04L 41/5012; H04L 41/5045; H04L 41/5051
USPC ....................................................... 709/217
See application file for complete search history.

(56) References Cited

U.S. PATENT DOCUMENTS

| | | | | |
|---|---|---|---|---|
| 7,480,907 B1* | 1/2009 | Marolia | ..................... | G06F 8/65 717/127 |
| 7,650,410 B2* | 1/2010 | Nemoto | ................... | H04L 67/02 709/203 |
| 7,822,840 B2* | 10/2010 | Chen | ......................... | G06F 9/54 709/203 |
| 7,895,338 B2* | 2/2011 | Leaute | .................... | H04L 29/06 709/227 |
| 8,032,588 B2* | 10/2011 | Fang | ......................... | G06F 9/54 707/695 |
| 8,359,390 B2* | 1/2013 | Cupit | ..................... | G06Q 10/06 709/223 |
| 8,478,812 B2* | 7/2013 | Oliver | ................... | G06F 9/5055 709/203 |
| 8,499,028 B2* | 7/2013 | Shu | ...................... | H04L 67/2823 709/202 |
| 8,504,644 B2* | 8/2013 | Shu | ................... | G06F 17/30861 709/203 |
| 8,635,316 B2* | 1/2014 | Barnhill, Jr. | ......... | H04L 12/2809 705/7.29 |

(Continued)

*Primary Examiner* — Daniel C. Murray

(57) ABSTRACT

Parameters associated with client devices may be determined, and a subset of the parameters associated with a particular client device may be identified. The subset of the parameters may include information related to hardware, software, and/or an identifier associated with the particular client device. A template associated with requesting a web service may be populated based on the subset of the parameters to form a web services request associated with the particular client device. The web service may be requested using the services request. A response to the services request, related to providing the web service to the particular client device, may be received, and the response may be evaluated with respect to the subset of the parameters, to determine whether the web service is compatible with the particular client device.

20 Claims, 7 Drawing Sheets

(56) References Cited

U.S. PATENT DOCUMENTS

| | | | | |
|---|---|---|---|---|
| 8,650,250 B2* | 2/2014 | Yamuna | H04L 12/66 | 709/201 |
| 8,813,186 B2* | 8/2014 | Hegg | G06F 21/33 | 709/250 |
| 8,972,487 B2* | 3/2015 | Todorova | H04L 43/50 | 709/203 |
| 8,990,917 B2* | 3/2015 | Cai | H04L 63/0245 | 726/11 |
| 9,088,440 B2* | 7/2015 | Cai | H04L 12/6418 | |
| 9,369,544 B1* | 6/2016 | Morgan | H04L 67/42 | |
| 2001/0056459 A1* | 12/2001 | Kurose | H04L 12/5695 | 709/201 |
| 2002/0161826 A1* | 10/2002 | Arteaga | H04L 29/06 | 709/203 |
| 2002/0174117 A1* | 11/2002 | Nykanen | G06Q 10/06 | |
| 2003/0110242 A1* | 6/2003 | Brown | H04L 29/06 | 709/222 |
| 2004/0064503 A1* | 4/2004 | Karakashian | G06F 9/541 | 709/203 |
| 2004/0260761 A1* | 12/2004 | Leaute | H04L 29/06 | 709/201 |
| 2005/0015491 A1* | 1/2005 | Koeppel | G06F 17/30867 | 709/226 |
| 2005/0071423 A1* | 3/2005 | Rajaniemi | H04W 4/02 | 709/203 |
| 2005/0210136 A1* | 9/2005 | Nemoto | H04L 67/10 | 709/225 |
| 2006/0075102 A1* | 4/2006 | Cupit | G06Q 10/06 | 709/225 |
| 2006/0190580 A1* | 8/2006 | Shu | H04L 67/2823 | 709/223 |
| 2007/0067437 A1* | 3/2007 | Sindambiwe | G06F 17/30899 | 709/224 |
| 2007/0150546 A1* | 6/2007 | Karakashian | H04L 67/02 | 709/207 |
| 2008/0082660 A1* | 4/2008 | Bachmann | G06F 9/5055 | 709/224 |
| 2008/0140760 A1* | 6/2008 | Conner | G06Q 50/10 | 709/201 |
| 2008/0140803 A1* | 6/2008 | Shu | G06F 17/30861 | 709/217 |
| 2008/0228503 A1* | 9/2008 | Buchheit | G06Q 30/0603 | 705/1.1 |
| 2009/0049065 A1* | 2/2009 | Weissman | G06F 8/71 | |
| 2009/0106350 A1* | 4/2009 | Chen | G06F 9/54 | 709/203 |
| 2009/0132698 A1* | 5/2009 | Barnhill, Jr. | H04L 12/2809 | 709/224 |
| 2009/0193132 A1* | 7/2009 | Plewnia | G06F 9/5027 | 709/230 |
| 2010/0312859 A1* | 12/2010 | Lev | H04L 67/02 | 709/219 |
| 2011/0078231 A1* | 3/2011 | Oliver | G06F 9/5055 | 709/203 |
| 2011/0231822 A1* | 9/2011 | Sabin | G06F 11/3688 | 717/124 |
| 2012/0131091 A1* | 5/2012 | Yamuna | H04L 12/66 | 709/203 |
| 2012/0131135 A1* | 5/2012 | Yamuna | G06F 9/541 | 709/217 |
| 2013/0036156 A1* | 2/2013 | Todorova | H04L 67/02 | 709/203 |
| 2013/0061291 A1* | 3/2013 | Hegg | G06F 21/33 | 726/4 |
| 2013/0117431 A1* | 5/2013 | Oliver | G06F 9/5055 | 709/223 |
| 2013/0308629 A1* | 11/2013 | Cai | H04L 12/6418 | 370/352 |
| 2014/0101290 A1* | 4/2014 | Johnston | G06F 17/30861 | 709/219 |
| 2014/0129706 A1* | 5/2014 | Yamuna | H04L 43/04 | 709/224 |
| 2014/0189845 A1* | 7/2014 | Cai | H04L 63/0245 | 726/12 |
| 2014/0201340 A1* | 7/2014 | Barnhill | H04L 12/2809 | 709/220 |
| 2014/0372509 A1* | 12/2014 | Fausak | H04L 67/02 | 709/203 |

* cited by examiner

| CLIENT DEVICE TYPE DATA 410-1 | HARDWARE ATTRIBUTE DATA 420-1 | SOFTWARE ATTRIBUTE DATA 430-1 | ADDITIONAL DATA 440-1 |
|---|---|---|---|
| ... | ... | ... | ... |
| CLIENT DEVICE TYPE DATA 410-N | HARDWARE ATTRIBUTE DATA 420-N | SOFTWARE ATTRIBUTE DATA 430-N | ADDITIONAL DATA 440-N |

400

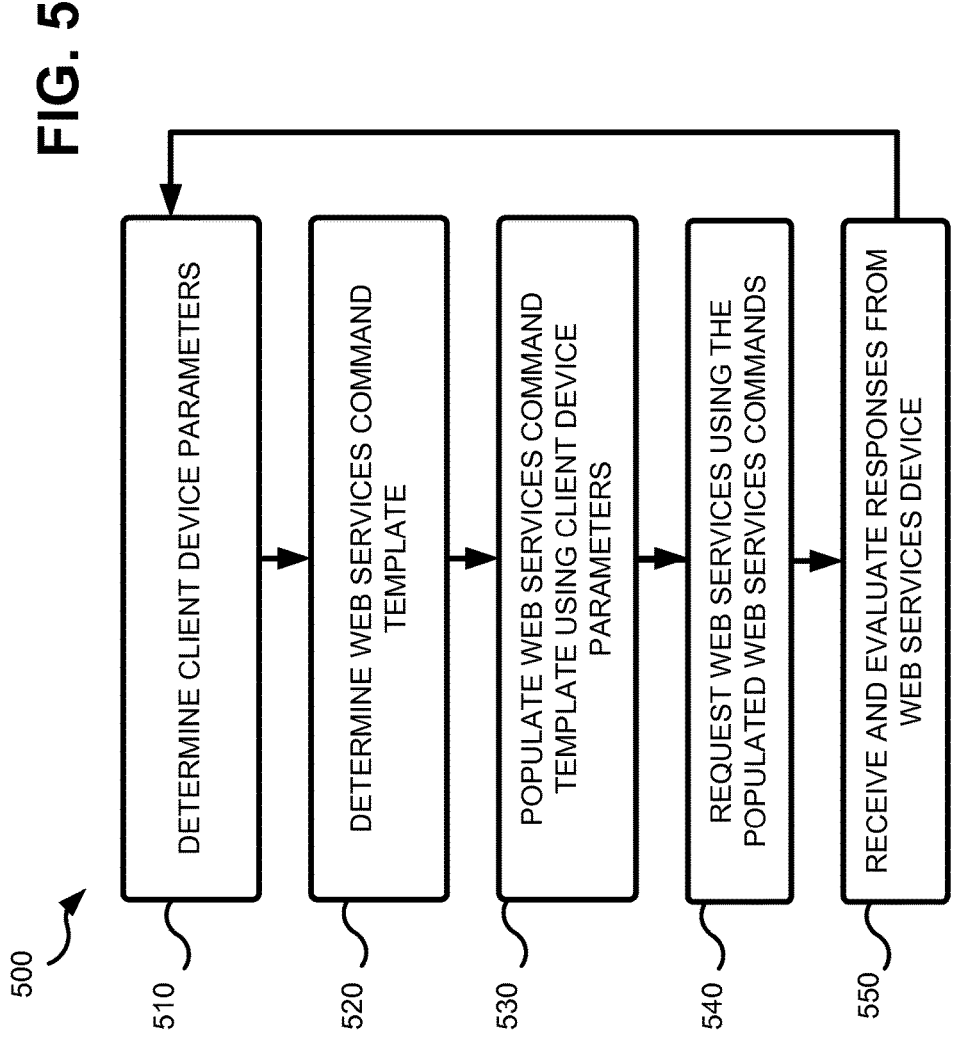

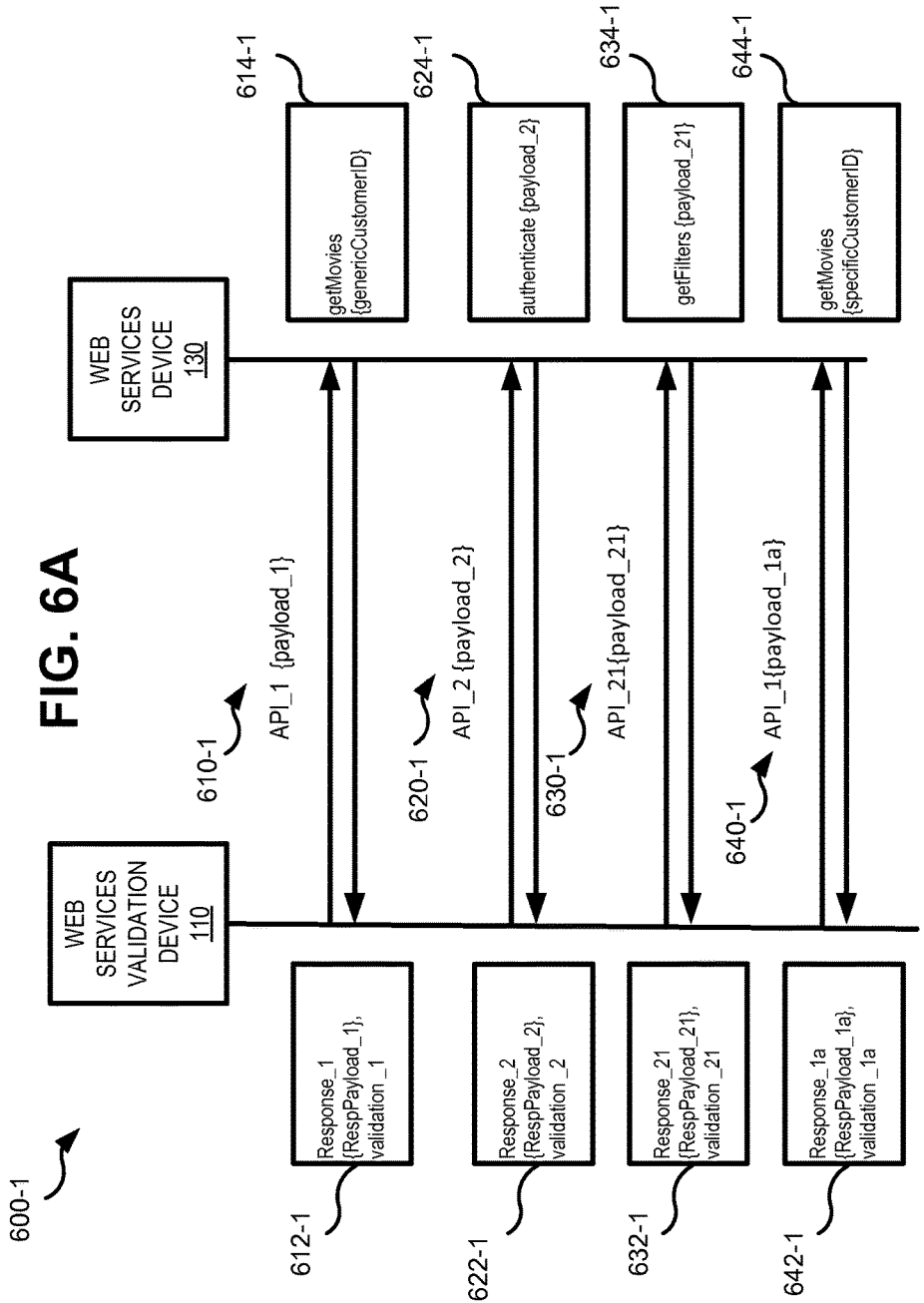

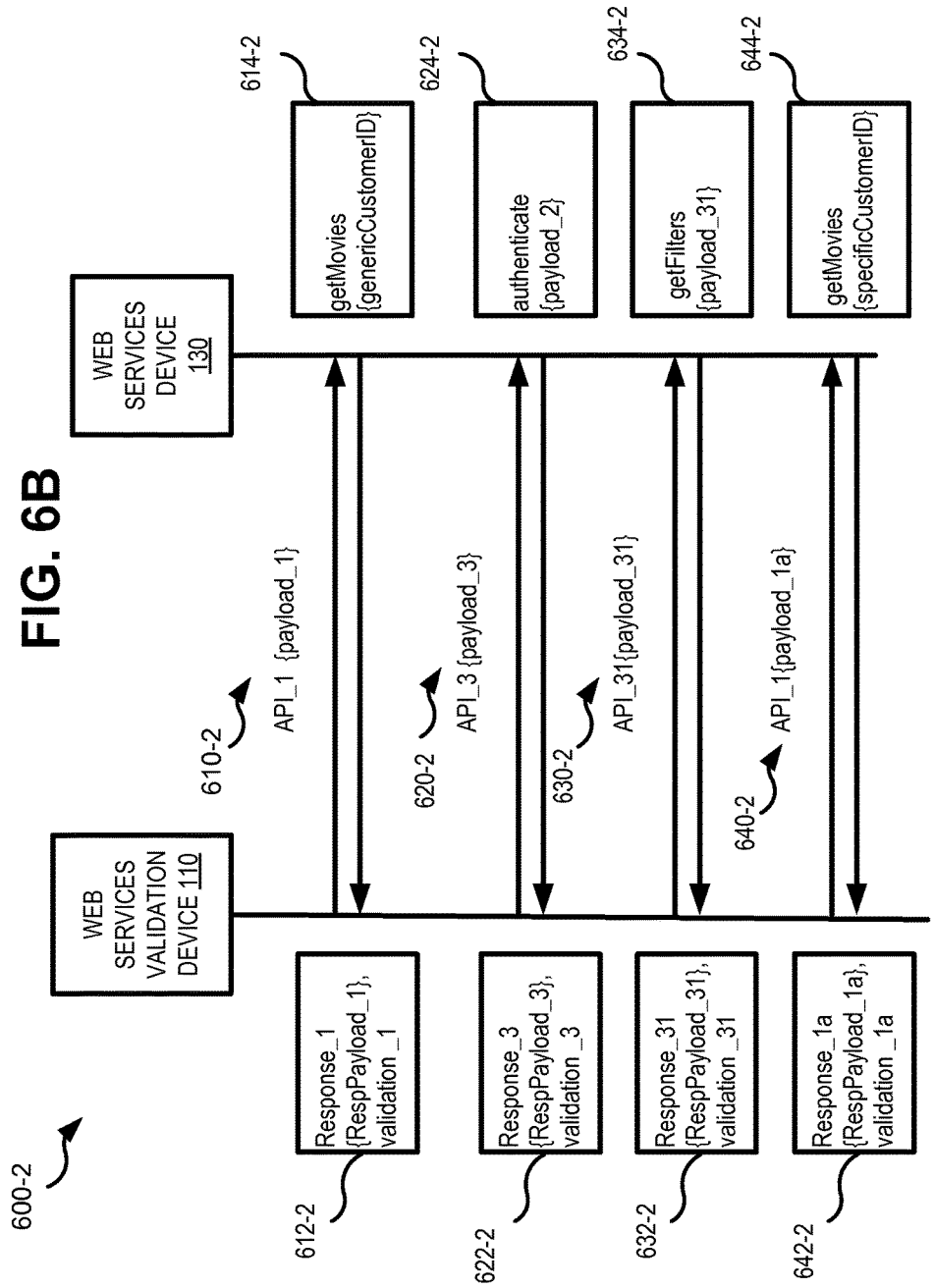

VALIDATING WEB SERVICES FOR COMPATIBILITY WITH A CLIENT DEVICE BY EMULATING THE CLIENT DEVICE BY POPULATING A TEMPLATE ASSOCIATED WITH THE WEB SERVICES

BACKGROUND

Web services may provide access to data, information, and other functionality to client or host devices on a network. A client device or host device may transmit a web service request, including a query for data or information, to a web service server. In response to receiving the web service request, the web service server may execute programming code for the web service and generate a web service response based on the received request. The server transmits the generated response, including data or information related to the query, back to the client device or host device. The client device or host device may communicate directly with the web service or may communicate with a web service application programming interface (API) associated with the web service.

Many networks provide extensible markup language (XML) based web services that may enable access to network data. For example, web services may be based on one or more network protocols designed to facilitate communications between users and web services servers. Examples of the network protocols may include, but are not limited to, the Simple Object Access Protocol (SOAP), the Representational State Transfer (REST) protocol, and the Hyper-Text Transfer Protocol (HTTP). The web services may also be designed to facilitate communications between a host or server and the web servers that host services for the host or server. A user (or host/server) may access a web service, for example through a web service application program or a web service API, which can provide one or more operations or functions (e.g., methods) for the user (or host/server) to use in accessing the web service. For example, a web-based catalog may provide services related to searching or browsing a catalog, selecting items from the catalog, performing checkout in order to purchase catalog items, etc. The programming code of a web service may be updated to provide new functionalities to users and client devices, to improve the efficiency of the web service (or associated web service API), etc., and when web service (or web service API) programming code is updated or improved, the web service (or web service API) may be tested to verify the compatibility of the service with different user devices.

BRIEF DESCRIPTION OF THE DRAWINGS

FIG. 5 is a flow chart of an exemplary process for validating web services from a web services device with respect to an emulated client device according to one implementation; and FIGS. 6A and 6B show exemplary communications related to requesting, from a web services device, web services for different client devices according to one implementation.

DETAILED DESCRIPTION

The following detailed description refers to the accompanying drawings. The same reference numbers in different drawings may identify the same or similar elements.

In systems and methods described herein, a web services evaluation device may determine parameters associated with client devices, and may identify a subset of the parameters associated with a particular client device. The subset of the parameters may include, for example, information identifying hardware, software, and/or other attributes associated with the particular client device. The web services testing device may emulate the particular client device by populating a template associated with requesting a web service using the subset of the parameters to form a web services request and requesting the web services with the web services request. A response to the services request, related to providing the web service to the particular client device, may be received, and the web services evaluation device may evaluate the response with respect to the subset of the parameters, to determine whether the web service is compatible with the emulated client device. The web services evaluation device may emulate another, different client device by populating the template with different parameters to form another request and evaluating a response to the other request.

Figure 1:
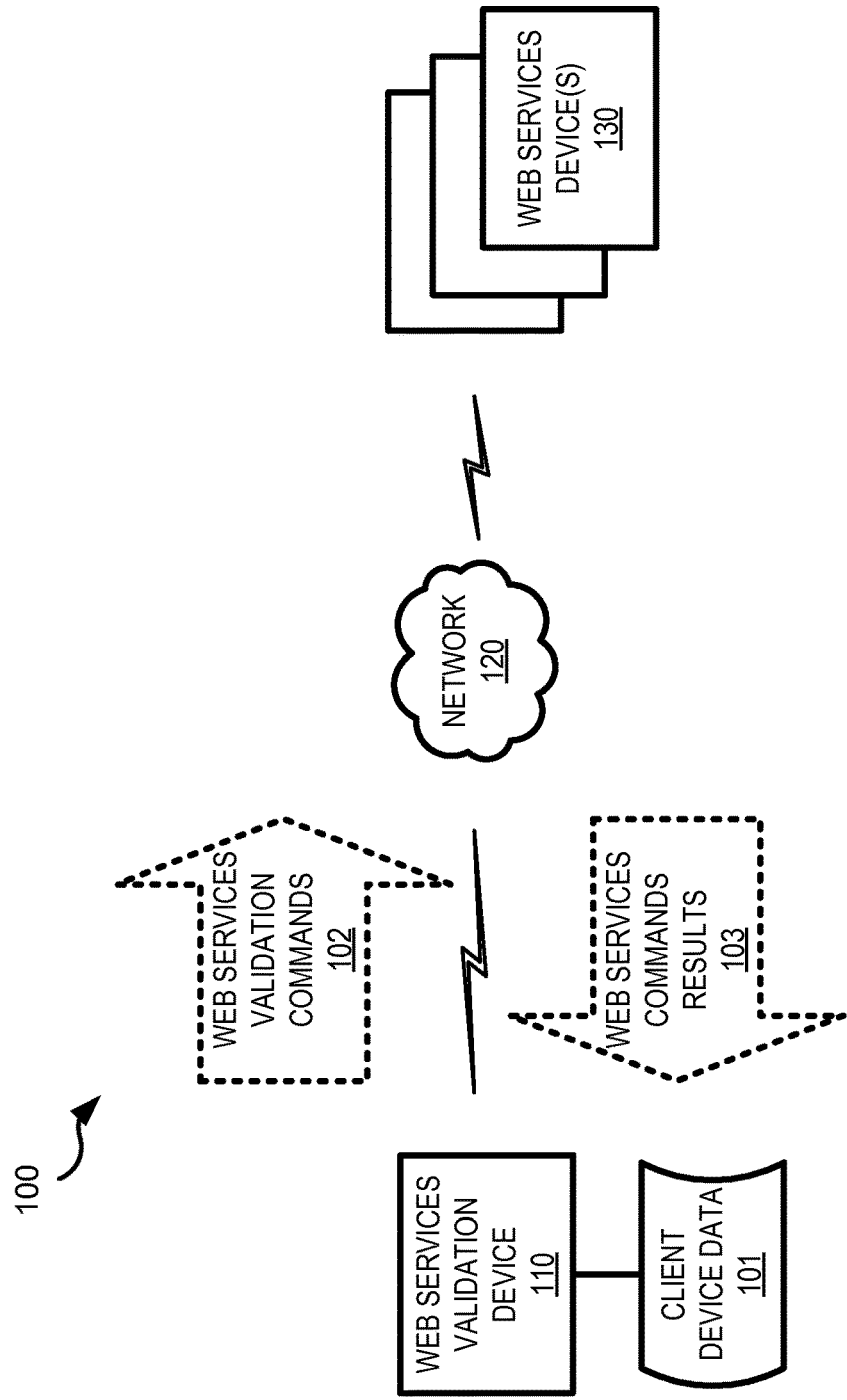
FIG. 1 shows an exemplary environment in which systems and/or methods described herein may be implemented according to one implementation.

FIG. 1 shows an exemplary environment 100 in which systems and/or methods described herein may be implemented according to one implementation. As illustrated in FIG. 1, environment 100 may include, for example, a web services validation (or testing) device 110, a network 120, and a web services device 130.

Web services validation device 110 may use client device data 101 to generate commands and/or web service application protocol interfaces (APIs) for emulating various client devices (not shown) requesting web services from web services device 130 and validate the web services received from web services device 130 with respect to the emulated client devices. As used herein, an API may refer to a process providing an interface for (or access to) one or more web services. The API can be executable code used for accessing a single web service, and/or for accessing two or more web services through routines providing additional functionality over the functionality of the individual web services. The term "client," as used herein, may refer to a process configured to consume a functionality of a service offered by a server. For example, when a client uses a service, the client is generally utilizing at least one function of the service. The client may be executed at any type of computing device (e.g., a client device) including, for example and without limitation, a desktop computer or workstation, a mobile device, or a host or network device that may operate at other times as a server to other clients. Furthermore, a client can be any type of remote or local process with respect to the computing device executing or hosting the service. A "server" process may be executed by any type of computing device capable of communicating data to one or more clients over a communication network.

In one implementation, web services validation device 110 may store web services command templates and may populate the web services command templates based on client device data 101 to generate web services validation commands 102 and may evaluate web services results 103 received from web services device 130.

Client device data 101 may include information identifying various features of a client device being emulated by web services validation device 110 so that web services validation device 110 may validate the web services devices 130 with respect to the client device. For example, client device data 101 may include information identifying software (e.g., an operating system, a browser application, etc.) and/or hardware (e.g., display/audio output device attributes, coder/decoder algorithms (CODECs), input/output (I/O) devices, etc.) associated with the emulated client device. Client device data 101 may relate to various types of client devices capable of communicating with web services device 130 to obtain web services. For example, client device data 101 may enable web services validation device 110 to emulate a set-top box (STB) or other device to receive content, such as television programming, VOD content, etc., and provide the content to televisions or other output devices (not shown). In another example, client device data 101 may enable web services validation device 110 to emulate a laptop computer, a tablet computer, a notebook computer, a personal computer (PC), an ultra mobile personal computer (UMPC), a netbook, a game-playing device/console, or other types of computation or communication devices. Client device data 101 may further enable web services validation device 110 to emulate a communication device, such as a voice over Internet protocol (VoIP) telephone (e.g., a session initiation protocol (SIP) telephone), a personal digital assistant (PDA) that can include a mobile telephone (e.g., a cell phone), a smart phone (e.g., that may combine a cellular radio with data processing and data communications capabilities), etc.

Web services validation commands 102 may include, for example, an address, uniform resource identifier (UCI) such as a uniform resource locator (URL), host name, port number, or other data associated with the web service and/or web services device 130. Web services validation commands 102 may take the form of an extensible markup language (XML) request or a JavaScript Object Notation (JSON) request to execute a command. Web services validation commands 102 may further include input parameters for the web service, such as input parameters defining a particular request.

Web services validation device 110 may evaluate web services results 103 received from web services device 130 based on client device data 101. For example, web services validation device 110 may determine whether web services results 103 are compatible with the emulated client device, as reflected by the client device data 101. For example, web services validation device 110 may determine whether web services provided by web services device 130 (as reflected in web services results 103) would be compatible with hardware and/or software associated with the emulated client device. For example, web services validation device 110 may determine whether the web services can be provided in a format that is usable by the emulated client device.

Network 120 may include a communications network, a data network, or a combination of networks that connect web services validation device 110 and web services device 130. For example, network 120 may include a local area network (LAN), a wide area network (WAN), a metropolitan area network (MAN), a wireless network, an optical fiber (or fiber optic) network, or a combination of these or other networks. In addition or alternatively, network 120 may be included in a radio network capable of supporting wireless communications to/from one or more devices in environment 100, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with future wireless network standards.

In one implementation, network 120 may be a local or private network between web services validation device 110 and web services device 130 for testing purposes, e.g. to avoid impact on actual customers. Alternatively, network 120 may provide channels through which web services device 130 communicates with client devices associated with customers during actual operation.

The web services device 130 may include a server or computer system to perform various functions related to providing web services (such as web service server application programs or APIs) via network 120. For example, the web services device 130 may receive and validate web services validation commands 102. After validating web services validation commands 102, web services device 130 may generate and send, as web services results 103, a response to web services validation commands 102.

In FIG. 1, the particular arrangement and number of components of environment 100 are illustrated with simplicity to enhance clarity of presentation. In practice, environment 100 may include additional, fewer, and/or different components. Furthermore, functions described as being performed by a component in environment 100 may be performed by a different component and/or by multiple components in environment 100. For example, web services validation device 110 and web services device 130 may be integrated into a single device and/or computing system.

Figure 2:
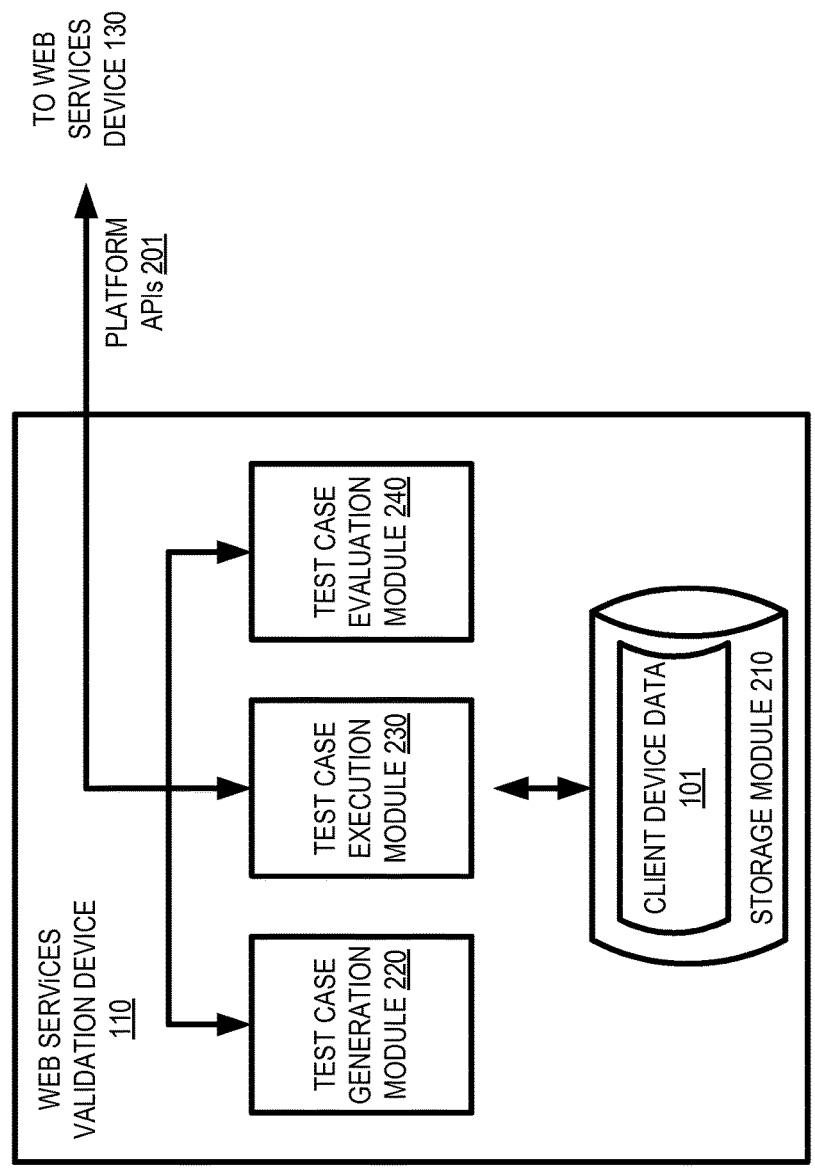
FIG. 2 shows a schematic representation of components included in an exemplary web services validation device included in the environment of FIG. 1 according to one implementation.

FIG. 2 shows a schematic representation of components included in an exemplary web services validation device 110 according to one implementation. As shown in FIG. 2, web services validation device 110 may include, for example, (a) a storage module 210 to store client device data 101, (b) a Test case generation module 220 to generate web services commands and platform APIs 201 based on attributes of a client device, (c) a test case execution module 230 to use the generated web services commands and platform APIs 201 to emulate the client device to request and receive web services, and (d) a test case evaluation module 240 to evaluate the received web services with respect to the client device being emulated.

Storage module 210 may include, for example, a data storage device using integrated circuit assemblies as memory (e.g., a state-state drive (SSD)), a magnetic recording medium (e.g., a tape drive or a hard disk drive (HDD)) and/or an optical recording medium (e.g., a digital video disk (DVD) or compact disc (CD)). Although shown as being included in web services validation device 110, storage module 210 may be separate from web services validation device 110, and web services validation device 110 and storage module 210 may communicate via a data connection (e.g., via network 120).

Storage module 210 may store client device data 101 in a tabular form that may include potential input values (e.g., row and/or column values) for generating web service requests, such as web service requests for transmission to the web services device 130. In one example, client device data 101 may include data entries corresponding to a field of a request for a web service and include one or more potential values for the field of the request. Each data entry may correspond to a field identified in a template used to generate the web services requests.

In one implementation, storage module 210 may include client device data 101 for different types of web services. For example, storage module 210 may include tables with different values (e.g., entries) associated with different web services (e.g., each web service application program and/or each web service API).

Test case generation module 220 may generate and store (e.g., to storage module 210) a template for creating a request for a web service. For example, Test case generation module 220 may generate the template based on a received user input. The template may provide a structure of the request, may include information or commands to be included in the request, and may identify fields or spaces for inserting input values into the request. For example, each field or space for inserting input values in the template may include one or more field codes and an indication of the type of input value or parameter to be included in the field or space. In addition, the template can include optional information, commands, fields or spaces that are optionally included in the web services request. In one example, the template may be an XML template used for creating an XML request for a web service from web services device 130. Test case generation module 220 may generate multiple templates, such as a different template for each web service (e.g., each web service application program, and/or each web service API) being validated.

Test case generation module 220 may generate web services validation commands 102 related to a client device by acquiring a portion of client device data 101 from storage module 210 and populating the template based on the acquired portion of client device data 101. For example, Test case generation module 220 may generate web services validation commands 102 so that they include data related to (1) requesting a web service for the emulated client device; (2) enabling web services device 130 to identify and validate the emulated client device being emulated by web services validation device 110; and/or (3) enabling web services device 130 to format the web services for use by the emulated client device (e.g., to be compatible with attributes of the emulated client devices embodied in client device data 101).

Test case execution module 230 may use the commands and/or platform APIs generated by test services generation module 220 to emulate an associated client device requesting web services from web services device 130. For example, test case execution module 230 may cause a thin client (not shown) associated with web services validation device 110 to operate as the emulated client device. As used herein, a "thin client" may refer to a computing device and/or program that operates based on the generated commands and/or platform APIs to emulate the client device.

Test case execution module 230 may further receive and store (e.g., in storage module 210) response messages carrying web services results 103 from the web services device 130. For example, test case execution module 230 may transmit each of the generated web service requests to web services device 130, and may receive a corresponding response message to the generated web service requests. The received response messages may be associated with a particular web service application program, a particular web service API, etc.

Test case evaluation module 240 may parse the response message received from web services device 130. For example, test case evaluation module 240 may use data from the response message to identify an emulated client device (e.g., by identifying a platform API used to forward the response message from web services device 130 and by determining a client device associated with the platform API). Test case evaluation module 240 may further identify web services data associated with the response message and may determine whether the web services data would be compatible with the emulated client device. For example, test case evaluation module 240 may access client device data 101 to identify software and/or hardware associated with the emulated client device, and test case evaluation module 240 may evaluate whether the web services data is compatible with the emulated client device (e.g., compatible with the identified software and/or hardware attributes).

In FIG. 2, the particular arrangement and number of components of web services validation device 110 are illustrated with simplicity to enhance clarity of presentation. In practice, web services validation device 110 are may include additional, fewer, and/or different components. For example, web services validation device 110 may include a storage module 210 to store client device data 101 and a second, separate storage device module 210 to store the templates for generating web services validation commands 102. Furthermore, functions described as being performed by a component in web services validation device 110 may be performed by a different component and/or by multiple components in environment 100. For example, two or more of test services generation module 220, test case execution module 230, and/or test case evaluation module 240 may be integrated into a single unit.

Figure 3:
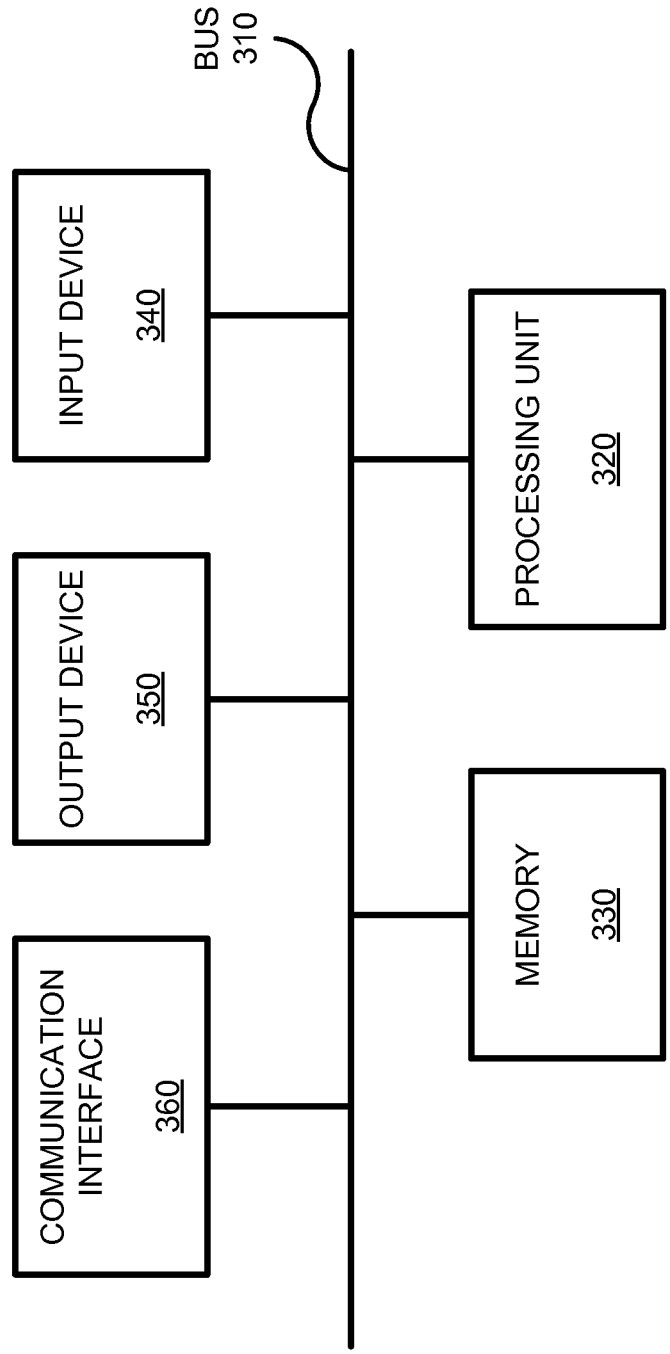
FIG. 3 is a diagram illustrating exemplary components of a device included in the environment of FIG. 1 according to one implementation.

FIG. 3 is a diagram illustrating exemplary components of a device 300. Web services validation device 110, a component of network 120 (e.g., a router, node, service, etc.), and/or web services device 130 may be implemented/installed as a combination of hardware and software on one or more respective user devices 300. As shown in FIG. 3, user device 300 may include, for example, a bus 310, a processing unit 320, a memory 330, one or more input devices 340, one or more output devices 350, and a communication interface 360.

Bus 310 may permit communication among the components of user device 300. Processing unit 320 may include one or more processors or microprocessors that interpret and execute instructions. In other implementations, processing unit 320 may be implemented as, or include, one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to user device 300, such as one or more of a keyboard, a keypad, a mouse, a pen, a microphone, one or more biometric mechanisms, and the like. Output device 350 may include a device that outputs information to the user, such as a display, a speaker, etc.

Communication interface 360 may include any transceiver-like mechanism that enables user device 300 to communicate with other devices and/or systems. For example, communication interface 360 may include mechanisms for communicating with other devices, such as other devices of environment 100. In one implementation, communication interface 360 may support short range wireless network communications (e.g., via Bluetooth® protocols). In other implementations, communication interface 360 may support other wired or wireless network communications.

As described herein, user device 300 may perform certain operations in response to processing unit 320 executing software instructions stored in a computer-readable medium, such as memory 330. A computer-readable medium may include a non-transitory tangible memory device. A memory device may be implemented within a single physical memory device or spread across multiple physical memory devices. The software instructions may be read into memory 330 from another computer-readable medium or read into memory 330 from another device via communication interface 360. The software instructions stored in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of user device 300, in other implementations, user device 300 may include fewer components, different components, differently-arranged components, or additional components than those depicted in FIG. 3. As an example, in some implementations, a display may not be included in user device 300. In these situations, user device 300 may be a "headless" device that does not include input device 340. Alternatively, or additionally, one or more components of user device 300 may perform one or more other tasks described as being performed by one or more other components of user device 300.

Figure 4:
FIG. 4 shows an exemplary table that includes client device data used by the web services validation device of FIG. 2 according to one implementation.

FIG. 4 shows an exemplary table 400 that includes client device data 101 according to one implementation. As shown in FIG. 4, table 400 may store, for example, client device type data 410, hardware attribute data 420, software attribute data 430, and additional data 440. As suggested in FIG. 4, hardware attribute data 420, software attribute data 430, and additional data 440 in a particular row may be associated with a particular client device type identified in client device type data 410 for the particular row, e.g., the particular client device type associated with Row 1 having 410-1, 420-1, 430-1 and 440-1 data, etc.

Client device type data 410 may include information associated with a client device, such as data identifying a manufacturer, model, etc. associated with the client device. Client device type data 410 further include information specifying, for example, whether the emulated client device is an STB, a computing device, a communication device, a gaming device, smart phone, etc. Hardware attribute data 420 may include information identifying hardware attributes (e.g., display/audio output device attributes, compatible coder/decoder algorithms (CODECs), input/output (I/O) devices, etc.) associated with the emulated client device. Software attribute data 430 may include information identifying software (e.g., an operating system, a browser application, etc.) associated with an emulated client device.

Table 400 may include additional data 440 regarding each client device type identified in client device type data 410. For example, additional data 440 may indicate an address, URI, host name, port number, or other data associated with client device type for purposes of requesting web services from web services device 130. Additional data 440 may further identify device-type specific input parameters for the web service, such as input parameters defining a particular request with respect to the particular client device, such as data to populate an XML web services request with respect to the client device type.

In one implementation, table 400 may be stored as a comma separate values (CSV) file, such as spreadsheet file. In addition, the CSV file may be evaluated using continuous integration software tool (such as Jenkins) for testing and reporting on isolated changes in a larger code base in real time to enable a developer to find and solve defects in the CSV file.

Although FIG. 4 shows exemplary data fields included in table 400, in other implementations, table 400 may include fewer, different, differently-arranged, or additional data fields than those depicted in FIG. 4. Alternatively, or additionally, one or more data fields of table 400 may store data being described as being stored in one or more other data fields of table 400.

FIG. 5 is a flow chart of an exemplary process 500 for validating web services from web services device 130 with respect to a particular client device. In one implementation, process 500 may be performed by web services validation device 110. In other implementations, process 500 may be performed by a different device, such as web services device 130. Process 500 is described with reference to components of web services validation device 110 shown in FIG. 2.

As shown in FIG. 5, process 500 may include determining parameters associated with the particular client device to be emulated (block 510). For example, as described above with respect to table 400 in FIG. 4, storage module 210 may collect hardware attribute data 420 identifying hardware attributes associated with the emulated client device, software attribute data 430 identifying software associated with an emulated client device, and/or other data 440 identifying device-type specific input parameters for the web service. Such other data 440 could be, e.g., input parameters defining a particular request with respect to the particular client device, such as data to populate an XML web services request with respect to the client device type. For example, storage module 210 may use client device identification data 410 (FIG. 4) to search for (e.g., using an internet search engine) hardware attribute data 420 and/or software attribute data 430.

Continuing with FIG. 5, process 500 may also include determining a web services command template (block 520) and populating the web services command template using the client device parameters (block 530). For example, Test case generation module 220 may generate the template based on a received user input. The template may provide a structure of the request, includes information or commands to be included in the request, and identifies fields or spaces for inserting input values into the request. For example, each field or space for inserting input values in the template may include one or more field codes and an indication of the type of input value or parameter to be included in the field or space. In addition, the template can include optional information, commands, fields or spaces that are optionally included in the web services request. In one example, test services generation module 220 may generate multiple templates in block 520, such as generating a different template for each web service (e.g., each web service application program, and/or each web service API) being validated.

In block 530, Test case generation module 220 may generate web services validation commands 102 related to a client device by acquiring a related portion of client device data 101 from storage module 210 and by populating the template based on the acquired portion of client device data 101. For example, Test case generation module 220 may generate web services validation commands 102 so that web services validation commands 102 may include data related to (1) requesting a web service for the emulated client device; (2) enabling web services device 130 to identify and validate the emulated client device being emulated by web services validation device 110; and (3) enabling web services device 130 to format the web services for use by the emulated client device (e.g., to be compatible with attributes of the emulated client devices as embodied in client device data 101).

As shown in FIG. 5, process 500 may further include requesting web services from web services device 130 using the populated web services commands (block 540). For example, test case execution module 230 may use the commands and/or platform APIs generated by test services generation module 220 to emulate an associated client device requesting web services from web services device 130. For example, test case execution module 230 may cause a thin client (not shown) associated with web services validation device 110 to operate as the emulated client device to request the web services.

As shown in FIG. 5, process 500 may still further include receiving and evaluating the web services responses from web services device 130 (block 550). For example, test case execution module 230 may receive response messages carrying web services results 103 from the web services device 130 and may parse the response message received from web services device 130 to identify web services data associated with the response message and to determine whether the web services data would be compatible with the emulated client device. For example, test case evaluation module 240 may access client device data 101 to identify software and/or hardware associated with the emulated client device, and test case evaluation module 240 may evaluate whether the web services data is compatible with the emulated client device (e.g., compatible with the identified software and/or hardware).

FIGS. 6A and 6B show exemplary communications 600 (shown in FIGS. 6A and 6B as communications 600-1 and communications 600-2, respectively) related to requesting, from web services device 130, delivery of movie listings for a particular customer according to one implementation. Communications 600-1 in FIG. 6A correspond to web services validation commands 102 and web services results 103 related to emulation of a first client device by web services validation device 110, and communications 600-2 in FIG. 6B correspond to web services validation commands 102 and web services results 103 related to emulation of a second, different client device by web services validation device 110. As shown in FIGS. 6A and 6B, communications 600 may include a first API 610 (shown in FIGS. 6A and 6B as first APIs 610-1 and 610-2) carrying a generic movie listing request 614 (shown in FIGS. 6A and 6B as first API generic movie listing requests 614-1 and 614-2) and a first response 612 (shown in FIGS. 6A and 6B as first responses 612-1 and 612-2) requesting information identifying the particular customer; a second API 620 (shown in FIGS. 6A and 6B as second APIs 620-1 and 620-2) carrying an authentication request 624 (shown in FIGS. 6A and 6B as authentication requests 624-1 and 624-2) and a second response 622 (shown in FIGS. 6A and 6B as second responses 622-1 and 622-2) forwarding authentication information; a third API 630 (shown in FIGS. 6A and 6B as third APIs 630-1 and 630-2) carrying a filtering request 634 (shown in FIGS. 6A and 6B as filtering requests 634-1 and 634-2) and a third response 632 (shown in FIGS. 6A and 6B as third responses 632-1 and 632-2) forwarding filtering information; and an updated first API 640 (shown in FIGS. 6A and 6B as updated first APIs 640-1 and 640-2) carrying a customer-specific movie listing request 644 (shown in FIGS. 6A and 6B as customer-specific movie listing requests 644-1 and 644-2) and a fourth response 642 (shown in FIGS. 6A and 6B as fourth responses 642-1 and 642-2) forwarding movie listings that are filtered for the particular customer.

In communications 600-1 and 600-2, APIs 610, 620, 630, and 640 may be associated with a web services call made using REST, SOAP, XML, or another protocol, and the payloads associated with APIs 610, 620, 630, and 640 may be an example of SOAP envelope, an HTTP Request with XML or JavaScript Object Notation (JSON) data, or a payload for an associated protocol. Web services validation device 110 may configure APIs 610, 620, 630, and 640 and the associated payloads based on the client device data 101 to emulate a client device. For example, APIs 610, 620, 630, and 640 and the associated payloads may include information identifying particular hardware (e.g., display device) and/or software (e.g., a browser application) associated with the emulated client device.

In the example shown in FIG. 6A, first API 610-1 (shown in FIG. 6A as "API_1") may carry a payload (shown in FIG. 6A as "payload_1") related to generic movie listing request 614-1 (shown in FIG. 6A as "getMovies {genericCustomerID}" and first response 612-1 (shown in FIG. 6A as "Response_1 {RespPayload_1}, validation_1") requesting information identifying the particular customer. Continuing with FIG. 6A, second API 620-1 (shown in FIG. 6A as "API_2") may carry a payload (shown in FIG. 6A as "payload_2") related to authentication request 624-1 (shown in FIG. 6A as "authenticate {payload_2}" and second response 622-1 (shown in FIG. 6A as "Response_2 {RespPayload_2}, validation_2") forwarding information identifying the particular customer. As shown in FIG. 6A, third API 630-1 (shown in FIG. 6A as "API_21") may carry a payload (shown in FIG. 6A as "payload_21") related to filtering request 634-1 (shown in FIG. 6A as "getFilters {payload_21}") to obtain movie listing filters for filtering information for the particular customer and third response 632-1 (shown in FIG. 6A as "Response_21 {RespPayload_21}, validation_21") forwarding the filtering information. Updated first API 640-1 may correspond to API_1 carrying a payload (shown in FIG. 6A as "payload_1a") related to customer-specific movie listing request 644-1 (shown in FIG. 6A as "getMovies {specificCusotmerID}") requesting filtered movie listings and fourth response 642-1 (shown in FIG. 6A as "Response_1 {RespPayload_1a}, validation_1a") forwarding the filtered movie listings.

As shown in FIG. 6B, the sequence of APIs 610, 620, 630, and 640 in communications 600-2 and the associated payloads, the responses provided by web services device 130, and validations to be performed to APIs 610, 620, 630, and 640 differ from the corresponding portions of communications 600-1 in FIG. 6A. For example, in communications 600-2, second API 620-2 (shown in FIG. 6B as "API_3") may carry a different payload (shown in FIG. 6B as "payload_3") related to authentication request 624-2 (shown in FIG. 6B as "authenticate {payload_3}" and second response 622-2 (shown in FIG. 6B as "Response_3{RespPayload_3}, validation_3") forwarding information identifying the particular customer; and third API 630-2 (shown in FIG. 6B as "API_31") may carry a payload (shown in FIG. 6B as "payload_31") related to filtering request 634-2 (shown in FIG. 6B as "getFilters {payload_31}") to obtain movie listing filtering information for the particular customer and third response 632-2 (shown in FIG. 6A as "Response_31 {RespPayload_31}, validation_31") forwarding the filtering information.

In one implementation, the payload for the test case associated with communications 600-1 and 600-2 may be replaced with a different set of payload parameters. For example, different specific customer identifiers (shown in FIGS. 6A and 6B as "specificCustomerID") may be used in communications 600-1 and 600-2 to test obtaining filtered movie listings for different customers (or types of customers) associated with different types of client devices types being emulated by web services validation device 110. For example, one type of client device may be associated with residential customers and a second type of client device may be associated with business customers, and the payload may be adjusted to reflect the different customers associated with the different client devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Also, while a series of blocks has been described with respect to process 500 in FIG. 5, the order of the blocks in process 500 may be modified in other implementations to include additional, fewer, and/or different blocks. Furthermore, non-dependent blocks in process 500 may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    determining, by a processor of a validation device, parameters associated with a plurality of client devices having network access to a plurality of web services for which corresponding compatibility determinations have been performed for each of the plurality of client devices;
    determining, by the validation device, that at least one of the plurality of web services has been updated since the corresponding compatibility determination;
    identifying, by the validation device, a first subset of the parameters associated with a first client device;
    determining, by the validation device, a template associated with requesting the at least one updated web service from a network device;
    emulating, by the validation device, the first client device by populating the template based on the first subset of the parameters, wherein populating the template generates web services validation commands including data related to:
        requesting the at least one updated web service for use by the first client device,
        identification and validation of the first client device, and
        formatting of the at least one updated web service for use by the first client device;
    transmitting, by the validation device to the network device, a first web services request for the at least one updated web service using the web services validation commands;
    receiving, by the validation device, a first response message forwarded from the network device in response to the first web services request, wherein the first response message contains web services data that relates to providing the at least one updated web service to the first client device;
    evaluating, by the validation device, the web services data to determine, based on the first subset of the parameters, whether the at least one updated web service is in a format that is compatible with the first client device; and
    validating, by the validation device, the at least one updated web service for use by the first client device based on a determination that the format is compatible.

2. The method of claim 1, wherein the first subset of the parameters includes information related to at least one of hardware or software associated with the first client device.

3. The method of claim 1, wherein the first subset of the parameters includes at least one of an address, a uniform resource identifier (URI), a host name, or a port number associated with the first client device.

4. The method of claim 1, wherein the first subset of the parameters includes data identifying device-type specific input parameters for the at least one updated web service.

5. The method of claim 1, wherein populating the template includes:
    generating an application protocol interface (API) to exchange data between the processor and the network device; and
    populating a payload for the API based on the first subset of the parameters.

6. The method of claim 5, wherein populating the payload includes:
    determining a simple object access protocol (SOAP) envelope based on the first subset of the parameters when the first web services request is a SOAP request;

determining extended meta-language (XML) or JavaScript object notation (JSON) data based on the first subset of the parameters when the first web services request is a Hyper-Text Transfer Protocol (HTTP) request; and determining representational state transfer (REST) data based on the first subset of the parameters when the first web services request is a REST protocol request.

7. The method of claim 1, further comprising:

determining a second subset of the parameters associated with a second client device that differs from the first client device;

populating the template based on the second subset of the parameters to form a second web services request associated with the second client device;

requesting the at least one updated web service using the second web services request;

receiving a second response to the second web services request, wherein the second response relates to providing the at least one updated web service to the second client device; and evaluating the second response, wherein evaluating the second response includes determining based on the second subset of the parameters whether the at least one updated web service is compatible with the second client device.

8. A validation device comprising:

a memory configured to store parameters associated with a plurality of client devices having network access to a plurality of web services for which corresponding compatibility determinations have been performed for each of the plurality of client devices; and a processor configured to:

determine that at least one of the plurality of web services has been updated since the corresponding compatibility determination, identify a first subset of the parameters associated with a first client device, determine a template associated with requesting the at least one updated web service from a network device, emulate the first client device by populating the template based on the first subset of the parameters, wherein populating the template generates web services validation commands that include data related to:

requesting the at least one updated web service for use by the first client device, identification and validation of the first client device, and formatting of the at least one updated web service for use by the first client device, transmit, to the network device, a first web services request for the at least one updated web service using the web services validation commands, receive a first response message forwarded from the network device in response to the first web services request, wherein the first response message contains web services data that relates to providing the at least one updated web service to the first client device, evaluate the web services data to determine, based on the first subset of the parameters, whether the at least one updated web service is in a format that is compatible with the first client device, and validate, based on a determination that the format is compatible, the at least one updated web service for use by the first client device.

9. The validation device of claim 8, wherein the first subset of the parameters includes information related to at least one of hardware or software associated with the first client device.

10. The validation device of claim 8, wherein the first subset of the parameters includes at least one of an address, a uniform resource identifier (URI), a host name, or a port number associated with the first client device.

11. The validation device of claim 8, wherein the first subset of the parameters includes data identifying device-type specific input parameters for the at least one updated web service.

12. The validation device of claim 8, wherein the processor, when populating the template, is further configured to:

generate an application protocol interface (API) to exchange data between the processor and the network device, and populate a payload for the API based on the first subset of the parameters.

13. The validation device of claim 12, wherein the processor, when populating the payload, is further configured to:

determine a simple object access protocol (SOAP) envelope based on the first subset of the parameters when the first web services request is a SOAP request, determine extended meta-language (XML) or JavaScript object notation (JSON) data based on the first subset of the parameters when the first web services request is a Hyper-Text Transfer Protocol (HTTP) request, and determine representational state transfer (REST) data based on the first subset of the parameters when the first web services request is a REST protocol request.

14. The validation device of claim 8, wherein the processor is further configured to:

determine a second subset of the parameters associated with a second client device that differs from the first client device, populate the template based on the second subset of the parameters to form a second web services request associated with the second client device, request the at least one updated web service using the second web services request, receive a second response to the second web services request, wherein the second response relates to providing the at least one updated web service to the second client device, and evaluate the second response, wherein evaluating the second response includes determining based on the second subset of the parameters whether the at least one updated web service is compatible with the second client device.

15. A non-transitory computer readable medium to store instructions, the instructions comprising:

instructions that, when executed by a processor associated with a validation device, cause the validation device to:

store parameters associated with a plurality of client devices having network access to a plurality of web services for which corresponding compatibility determinations have been performed for each of the plurality of client devices, determine that at least one of the plurality of web services has been updated since the corresponding compatibility determination, identify a first subset of the parameters associated with a first client device, determine, a template associated with requesting the at least one updated web service from a network device, emulate the first client device by populating the template based on the first subset of the parameters, wherein populating the template generates web services validation commands that include data related to:
- requesting the at least one updated web service for use by the first client device,
- identification and validation of the first client device, and
- formatting of the at least one updated web service for use by the first client device, transmit, to the network device, a first web services request for at least one updated web service using the web services validation commands, receive a first response message forwarded from the network device in response to the first web services request, wherein the first response message contains web services data that relates to providing the at least one updated web service to the first client device, evaluate the web services data to determine, based on the first subset of the parameters, whether the at least one updated web service is in a format that is compatible with the first client device, and validate, based on a determination that the format is compatible, the at least one updated web service for use by the first client device.

16. The non-transitory computer readable medium of claim 15, wherein the first subset of the parameters includes information related to at least one of hardware or software associated with the first client device.

17. The non-transitory computer readable medium of claim 15, wherein the first subset of the parameters includes at least one of an address, a uniform resource identifier (URI), a host name, or a port number associated with the first client device.

18. The non-transitory computer readable medium of claim 15, wherein the instructions further cause the validation device, when populating the template, to:

generate an application protocol interface (API) to exchange data between the processor and the network device, and populate a payload for the API based on the first subset of the parameters.

19. The non-transitory computer readable medium of claim 18, wherein the instructions further cause the validation device, when populating the payload, to:

determine a simple object access protocol (SOAP) envelope based on the first subset of the parameters when the first web services request is a SOAP request, determine extended meta-language (XML) or JavaScript object notation (JSON) data based on the first subset of the parameters when the first web services request is a Hyper-Text Transfer Protocol (HTTP) request, and determine representational state transfer (REST) data based on the first subset of the parameters when the first web services request is a REST protocol request.

20. The non-transitory computer readable medium of claim 18, wherein the instructions further cause the validation device to:

determine a second subset of the parameters associated with a second client device that differs from the first client device, populate the template based on the second subset of the parameters to form a second web services request associated with the second client device, request the at least one updated web service using the second web services request, receive a second response to the second web services request, wherein the second response relates to providing the at least one updated web service to the second client device, and evaluate the second response, wherein evaluating the second response includes determining based on the second subset of the parameters whether the at least one updated web service is compatible with the second client device.

\* \* \* \* \*